United States Patent [19]
Yoo

[11] Patent Number: 6,027,427
[45] Date of Patent: Feb. 22, 2000

[54] HYDRAULIC CONTROL SYSTEMS FOR AN AUTOMATIC TRANSMISSION

[75] Inventor: Pyung Hwan Yoo, Kyunggi-Do, Rep. of Korea

[73] Assignee: Hyundai Motor Co., Kyunggi-Do, Rep. of Korea

[21] Appl. No.: 08/951,158

[22] Filed: Oct. 15, 1997

[51] Int. Cl.$^7$ .................................................. F16H 61/26
[52] U.S. Cl. ........................................... 477/130; 477/906
[58] Field of Search .................................. 477/127, 130, 477/143, 906, 131

[56] References Cited

U.S. PATENT DOCUMENTS

| | | | |
|---|---|---|---|
| 4,829,853 | 5/1989 | Sakaguchi | 477/127 X |
| 4,903,551 | 2/1990 | Hiramatsu et al. | 477/131 |
| 5,441,459 | 8/1995 | Inukai et al. | 475/127 |
| 5,507,706 | 4/1996 | Jang et al. | 477/130 |
| 5,537,887 | 7/1996 | Jang et al. | 477/131 X |
| 5,544,538 | 8/1996 | Takagi et al. | 477/906 X |
| 5,564,543 | 10/1996 | Wilson | 477/131 X |
| 5,597,372 | 1/1997 | Jang | 477/143 |
| 5,626,533 | 5/1997 | Jang | 477/130 X |
| 5,637,056 | 6/1997 | Park | 477/143 X |
| 5,651,751 | 7/1997 | Jang | 477/131 X |
| 5,658,220 | 8/1997 | Jang | 477/130 |
| 5,674,153 | 10/1997 | Jang | 477/906 X |
| 5,730,683 | 3/1998 | Usuki et al. | 477/143 |
| 5,876,303 | 3/1999 | Yu | 477/130 X |

*Primary Examiner*—Charles A Marmor
*Assistant Examiner*—Scott Lund

[57] ABSTRACT

A hydraulic control system for an automatic transmission includes a pressure regulator for regulating hydraulic pressure produced in an oil pump, and a plurality of valves selectively supplying the regulated hydraulic pressure to a first number of friction elements. A second number of solenoid valves controls operation of the first number of friction elements by controlling supply of the regulated hydraulic pressure to the plurality of valves; wherein the second number is less than the first number. A manual valve controls supply of the regulated pressure to the second number of solenoid valves.

4 Claims, 13 Drawing Sheets

FIG. 2

| SHIFT LEVER POSITION | | ENGAGED FRICTION ELEMENTS | | | | | | | SOLENOID STATE | | | |
|---|---|---|---|---|---|---|---|---|---|---|---|---|
| | | C1 | C2 | C3 | B1 | B2 | B3 | B4 | S1 | S2 | S3 | S4 |
| P,N | | | | | ○ | | | ○ | ON | OFF | ON | ON |
| R | | | ○ | | ○ | | | ○ | ON | OFF | OFF | ON |
| D4 (OD ON) | 1 | ○ | | | | | | ○ | OFF | ON | ON | ON |
| | 2 | ○ | | | | ○ | | ○ | OFF | OFF | ON | ON |
| | 3 | ○ | ○ | | | ○ | | ○ | OFF | OFF | OFF | ON |
| | 4 | ○ | ○ | ○ | | ○ | | | ON | OFF | OFF | OFF |
| D3 (OD OFF) | 1 | ○ | | | | | | ○ | OFF | ON | ON | ON |
| | 2 | ○ | | | | ○ | | ○ | OFF | OFF | ON | ON |
| | 3 | ○ | ○ | | | ○ | | ○ | OFF | OFF | OFF | ON |
| D2 | 1 | ○ | | | | | | ○ | OFF | ON | ON | ON |
| | 2 | ○ | | | | ○ | ○ | ○ | OFF | OFF | ON | OFF |
| DL | 1 | ○ | | | ○ | | | ○ | OFF | OFF | ON | ON |

HYDRAULIC CONTROL SYSTEMS FOR AN AUTOMATIC TRANSMISSION

BACKGROUND OF THE INVENTION

1. Field of the Invention

The present invention relates to a hydraulic control system for an automatic transmission and, more particularly, to a hydraulic control system using a fewer number of solenoid valves to control the friction elements of the automatic transmission.

2. Description of Related Art

In conventional hydraulic control systems for automatic transmissions having a plurality of friction elements such as clutches and brakes, these hydraulic control systems include a friction element controller. The friction element controller includes a plurality of solenoid valves. Specifically, the friction element controller includes one solenoid valve corresponding to each friction element. Each solenoid valve controls application and release of the corresponding brake or clutch (i.e. friction element).

By being able to independently control each friction element, the simultaneous engagement of two friction elements, which would cause the automatic transmission to fail, is prevented. For instance, one well-known automatic transmission includes first, second and third clutches and first, second, third and fourth brakes. Simultaneously engaging both the first and second brakes, both the second clutch and third brake, or both the third clutch and the fourth brake, will cause the automatic transmission to fail. By providing a solenoid value corresponding to each friction element, for independent control thereof, in the hydraulic control system, failure of the automatic transmission because of a detrimental simultaneous engagement of friction elements can be prevented.

Because of their cost, however, having such a large number of solenoid valves significantly increases the cost of the hydraulic control system.

SUMMARY OF THE INVENTION

It is an object of the present invention to overcome the drawbacks and disadvantages of the conventional art.

One object of the present invention is to provide a hydraulic control system having a reduced number of solenoid valves.

It is a further object of the present invention to provide a hydraulic control system in which one solenoid valve can control two friction elements.

These and other objectives are achieved by providing a hydraulic control system for an automatic transmission, comprising: pressure regulating means for regulating hydraulic pressure produced in an oil pump; a plurality of valves selectively supplying said regulated hydraulic pressure to a first number of friction elements; a second number of solenoid valves controlling operation of said first number of friction elements by controlling supply of said regulated hydraulic pressure to said plurality of valves, said second number being less than said first number; and a manual valve controlling supply of said regulated pressure to said second number of solenoid valves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram illustrating the operational states of the friction elements and solenoid values for each possible mode of operation;

DETAILED DESCRIPTION OF THE PREFERRED EMBODIMENTS

Figure 1:
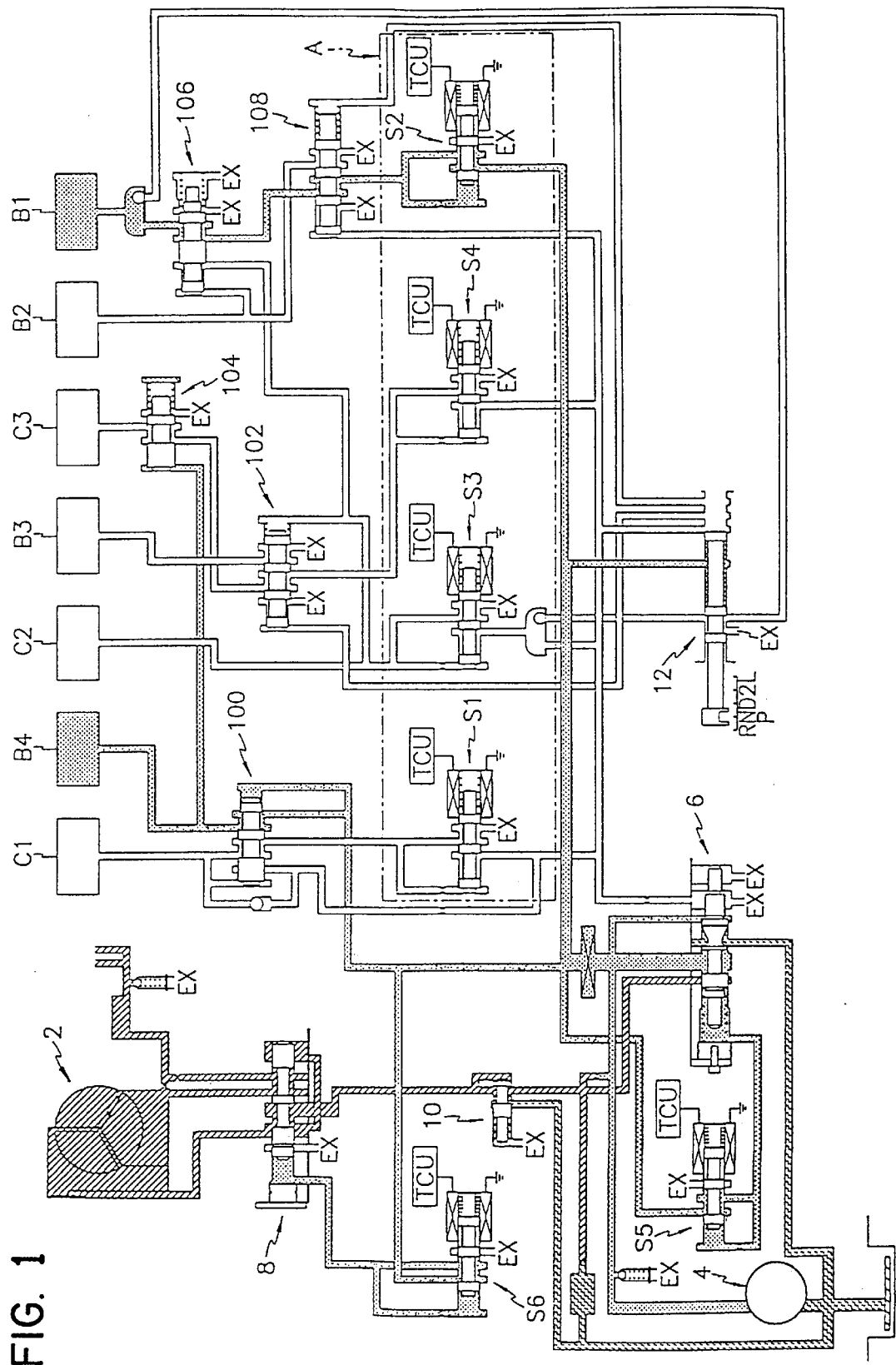
FIG. 1 illustrates the hydraulic pressure flow state in a neutral or parking range of the hydraulic control system of the present invention.

FIG. 1 illustrates the hydraulic pressure flow state in the neutral or park range of the hydraulic control system according to the present invention. As shown in FIG. 1, the hydraulic control system includes a manual valve 12, the position of which is controlled via a shift lever by the driver. Using the manual valve 12, the driver can select a reverse, neutral or park, drive D, lower gear drive 2, and lowest gear drive L range of operation.

The hydraulic control system also includes a torque converter 2 which receives power from an engine, and converts and transmits this power to the automatic transmission. An oil pump 4 creates and discharges oil pressure. A pressure regulator valve 6 makes the pressure generated by the oil pump 4 constant, while a torque converter control valve 10 controls the oil pressure to a fixed level for the torque converter 2. As shown, a damper clutch control valve 8 controls the operation of a damper clutch (not shown) in the torque converter 2 to increase the power transmission efficiency of the torque converter 2.

The pressure output by the pressure regulator valve 6 is selectively supplied to a plurality of friction elements C1–C3 and B1–B4 by first, second and third switch valves 100, 102 and 108, and first and second fail-safe valves 104 and 106. The friction elements include first, second and third clutches C1, C2 and C3, and first, second, third and fourth brakes B1, B2, B3 and B4. The friction elements represent the friction elements of the well-known automatic transmission discussed in the Background of the Invention section, wherein the simultaneous engagement of both the first and second brakes B1 and B2, both the second clutch C2 and the third brake B3, or both the third clutch C3 and the fourth brake B4 will cause the automatic transmission to fail.

A friction element controller A in cooperation with the manual valve 12 controls the operation of the first-third switch valves 100, 102 and 108, and the first and second fail-safe valves 104 and 106. As shown in FIG. 1, the friction element controller A includes first, second, third and fourth solenoid valves S1–S4. The hydraulic control system according the present invention further includes fifth and sixth solenoid valves S5 and S6, controlling the operation of pressure regulator valve 6 and damper clutch control valve 8, respectively. A transmission control unit TCU controls the operation of the first-sixth solenoid valves S1–S6.

Figure 3:
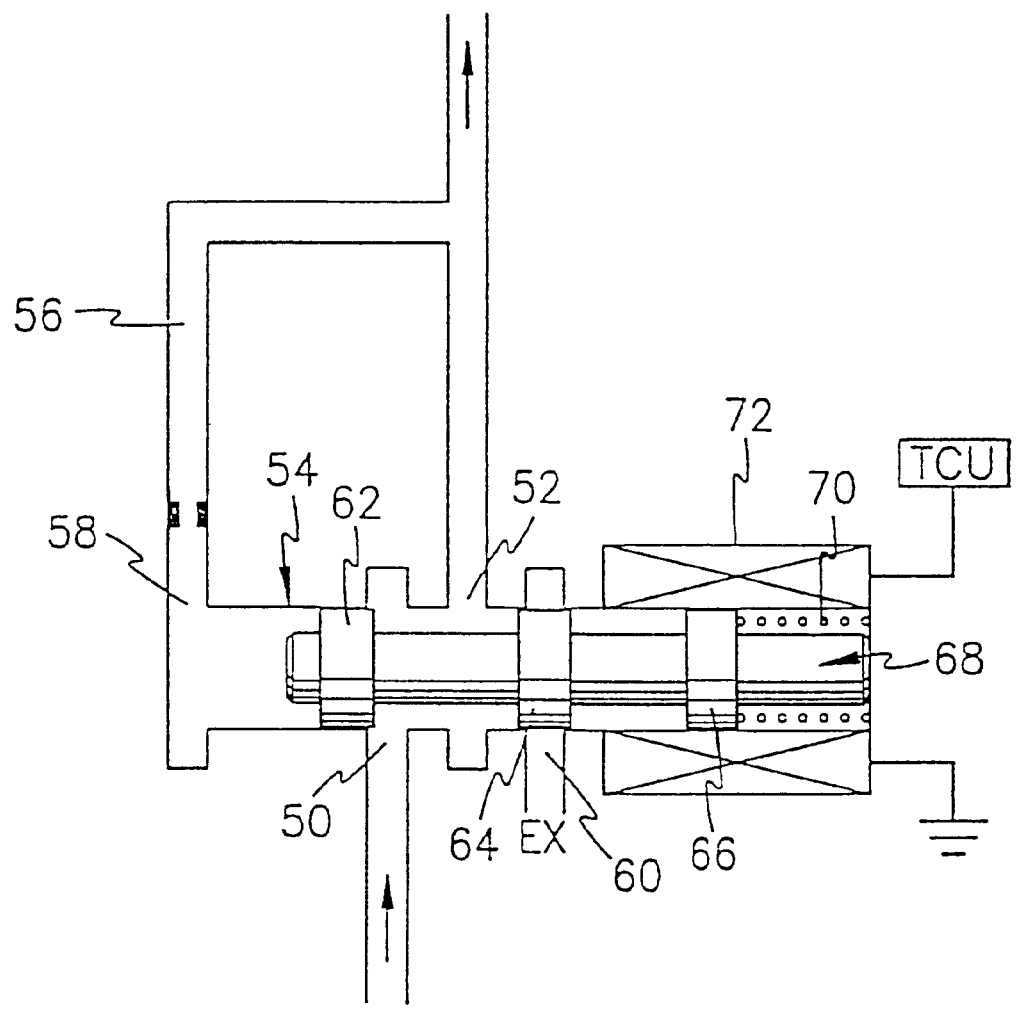
FIG. 3 illustrates an embodiment of the solenoid valves used in the hydraulic control system of the present invention.

FIG. 3 illustrates the structure of the first-sixth solenoid valves S1–S6. As shown in FIG. 3, a solenoid valve includes a spool 68 having first, second and third lands 62, 64 and 66 disposed thereon. A first port 50 receives hydraulic pressure which, depending upon the position of the spool 68, is output via second port 52. A line 56 communicates second port 52 with a third port 58. Additionally, the hydraulic fluid supplied to port 50 can be, depending upon the position of spool 68, exhausted via fourth port 60. In the OFF state, the spool 68 is biased to the left by a spring 70, but moves to the right when the TCU energizes a coil 72.

Figure 4:
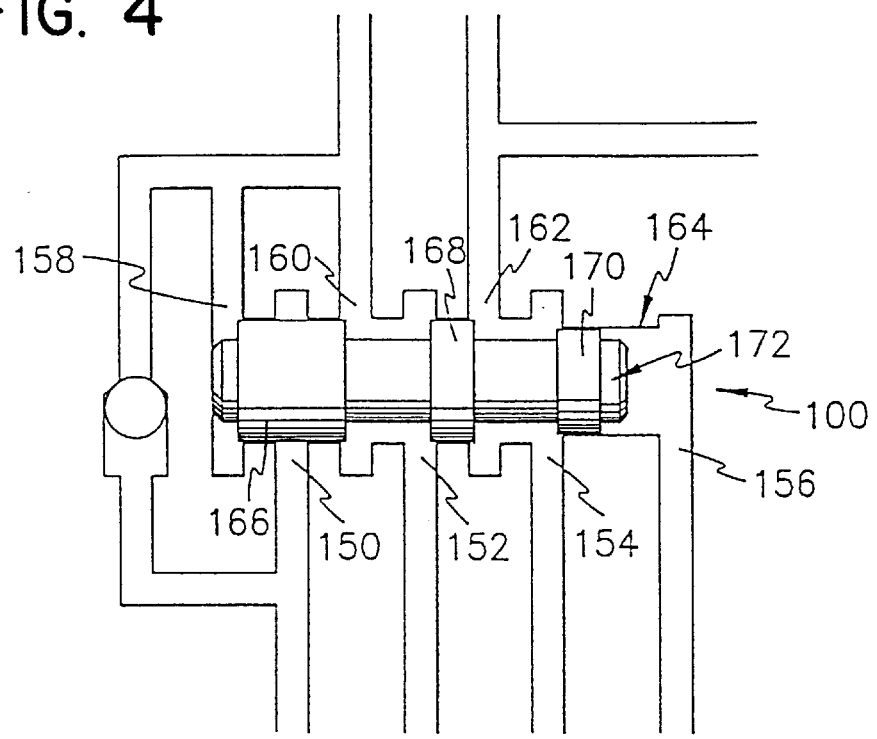
FIG. 4 illustrates the first switch valve in the hydraulic control system according to the present invention.

FIG. 4 illustrates the first switch valve 100. As shown in FIG. 4, the first switch valve 100 includes a spool 172, having first, second and third lands 166, 168 and 170, disposed within valve body 164. A first port 150 is in fluid communication with a port of the pressure regulator valve 6, a second port 152 is connected to the first solenoid valve Si, and third and fourth ports 154 and 156 are connected to the pressure regulator valve 6. The first port 150 is in further fluid communication with a fifth and sixth port 158, 160 via a check valve. Both the fifth and sixth ports 158, 160 are connected to the first clutch C1. The seventh port 162 is connected to both the fourth brake B4 and a port of the first fail-safe valve 104.

Figure 5:
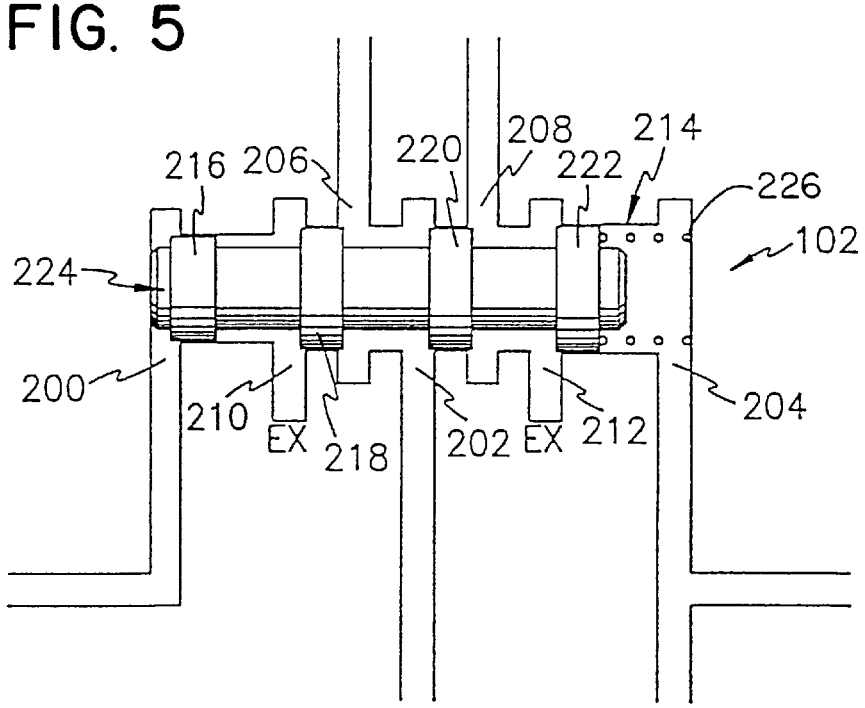
FIG. 5 illustrates the second switch valve in the hydraulic control system according to the present invention.

FIG. 5 illustrates the second switch valve 102. As shown in FIG. 5, the second switch valve 102 includes a spool 244, having first, second, third and fourth lands 216, 218, 220 and 222, disposed in valve body 214. A first port 200 is connected to the manual valve 12. A second port 202 is connected to the fourth solenoid valve S4, while a third port 204 is connected to the third solenoid valve S3 and the second fail-safe valve 106. A fourth port 206 is connected the first fail-safe valve 104, and a fifth port 208 is connected to the third brake B3. Between the first and second ports 200 and 202 is a first exhaust port 210, and between the second and third ports 202, 204 is a second exhaust port 212. The spool 224 is biased to the left by a spring 226.

Figure 6:
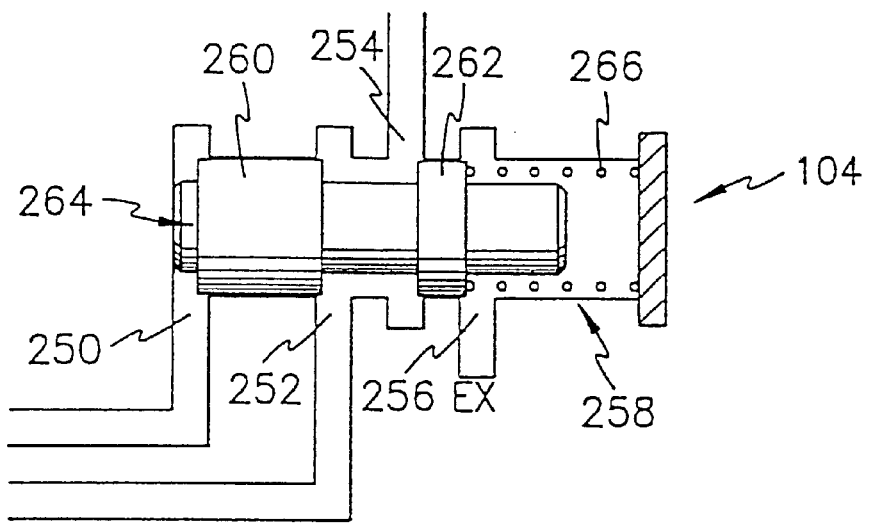
FIG. 6 illustrates the first fail-safe valve in the hydraulic control system according to the present invention.

FIG. 6 illustrates the first fail-safe valve 104. The first fail-safe valve 104 includes a spool 264, having first and second lands 260 and 262, disposed in valve body 258. A first port 250 is connected to the seventh port 162 of the first switch valve 100 and the fourth brake B4. A second port 252 is connected to the fourth port 206 of the second switch valve 102, and a third port 254 is connected to the third clutch C3. To the right of the second port 252 is an exhaust port 256. A spring 266 biases the spool 264 to the left.

Figure 7:
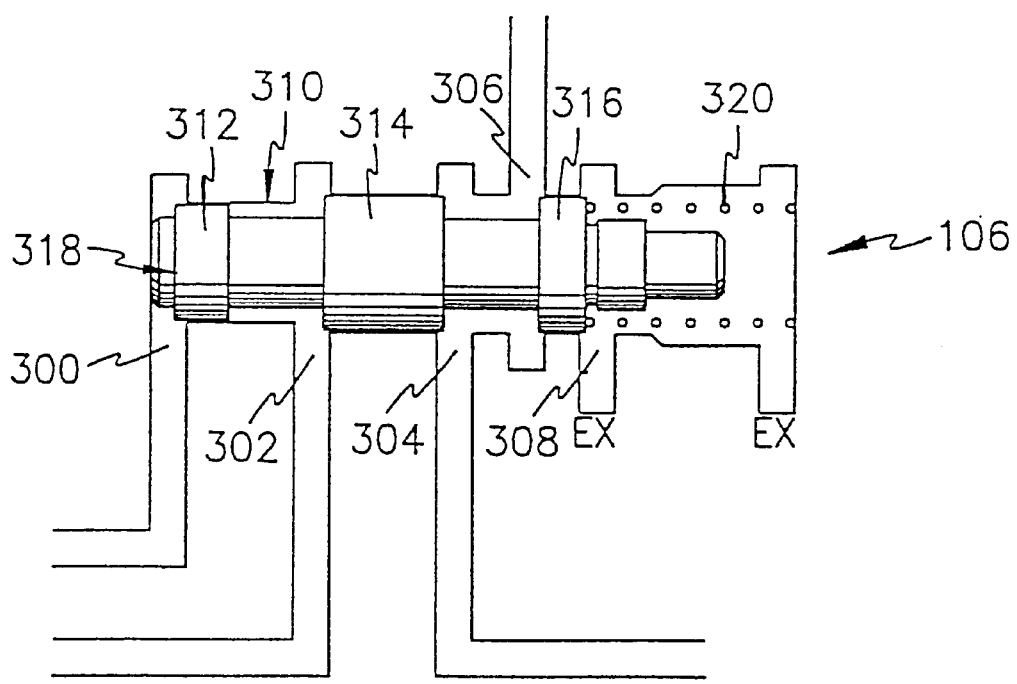
FIG. 7 illustrates the second fail-safe valve in the hydraulic control system according to the present invention.

FIG. 7 illustrates the structure of the second fail-safe valve 106. As shown in FIG. 7, a spool 318, having first, second and third lands 312, 314 and 316, is disposed in a valve body 310. A first port 300 is connected to brake B2 and the third switch valve 108. A second port 302 is connected to the third port 204 of the second switch valve 102 and the third solenoid S3. A third port 304 is connected to the third switch valve 108, and a fourth port 306 is connected to the first brake B1. To the right of the third port 304 is an exhaust port 308. A spring 320 biases the spool 318 to the left.

Figure 8:
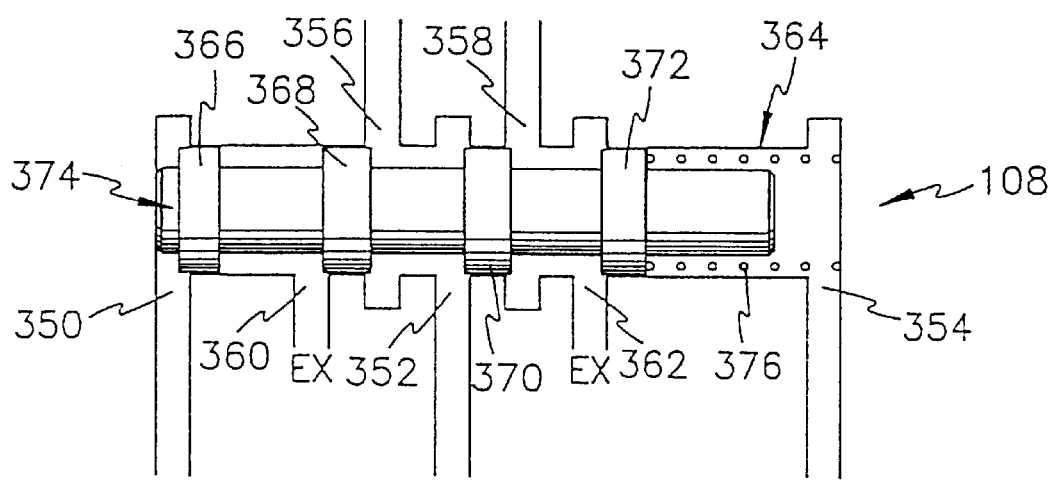
FIG. 8 illustrates the third switch valve in the hydraulic control system according to the present invention.

FIG. 8 illustrates the structure of the third switch valve 108. As shown in FIG. 8, the third switch valve 108 includes a spool 374, having first, second, third and fourth lands 366, 368, 370 and 372, disposed in a valve body 364. A first port 350 is connected to the manual valve 12. A second port 352 is connected to the second solenoid S2. A third port 354 is connected to the manual valve 12. A fourth port 356 is connected to the third port 304 of the second fail-safe valve 106. A fifth port 358 is connected to the second brake B2 and the first port 300 of the second fail-safe valve 106. A spring 376 biases the spool 374 to the left. Between first port 350 and second port 352 is an exhaust port 360, and between second port 352 and third port 354 is another exhaust port 362.

Next, the operation of the present invention will be described with reference to FIGS. 1–2 and 9–15. FIG. 2 illustrates which solenoid valves are ON and OFF, and which friction elements are engaged or disengaged, for each possible driving range. As shown in FIG. 2, the solenoid valves and friction elements have the same state in the park and neutral range. There is a single reverse range, and there are four driving ranges. The driving range D4 corresponds to the driving range when the manual valve 12 is placed in drive D and overdrive is ON. When overdrive is ON, driving in a fourth speed stage is permitted. When overdrive is OFF, driving in the fourth speed stage is not permitted, and driving in the D range is shown by D3 in FIG. 2. The last two driving ranges are where the driver moves the manual valve 12 to driving range 2 or the lowest driving range L. These two settings are illustrated in FIG. 2 as D2 and DL, respectively.

As shown in FIG. 2, the TCU turns the first, third and fourth solenoid valves S1, S3 and S4 ON and turns the second solenoid valve S2 OFF in the neutral or park driving ranges. FIG. 1 illustrates the hydraulic pressure flow state in the neutral or park driving ranges. As shown in FIG. 1, the hydraulic pressure from the pressure regulator valve 6 is supplied to brake B4 by the first switch valve 100, and to the first brake B1 via the second solenoid S2, the third switch valve 108 and the second valve 106.

Figure 9:
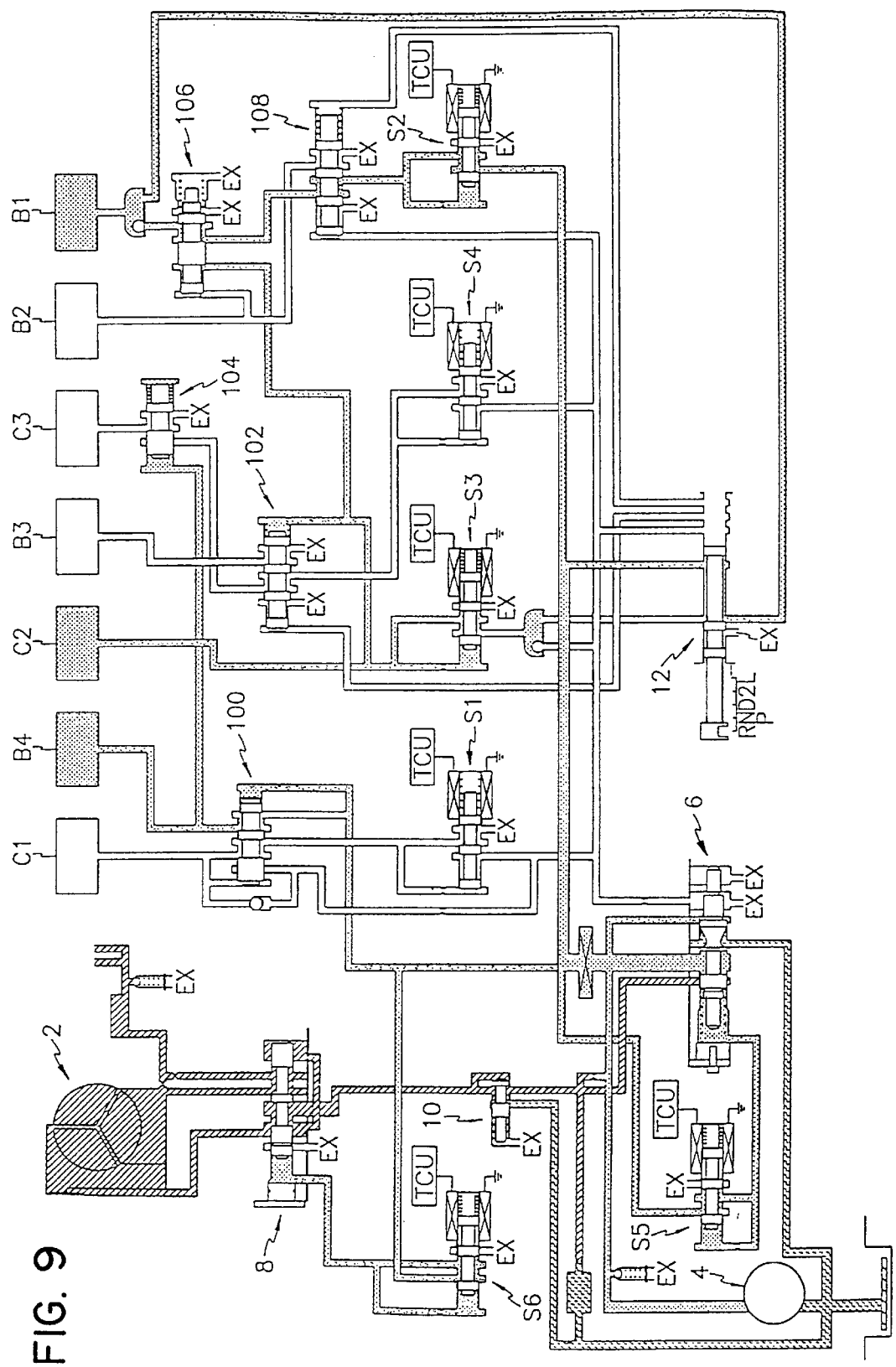
FIG. 9 illustrates the hydraulic pressure flow state in the reverse range of the hydraulic control system according to the present invention.

When placed in reverse, the TCU turns the third solenoid valve S3 OFF. As shown in FIG. 9, in reverse, the manual valve 12 supplies hydraulic pressure to the third solenoid valve S3. Because the third solenoid valve S3 is OFF, the hydraulic pressure is then supplied to the second clutch C2.

Figure 10:
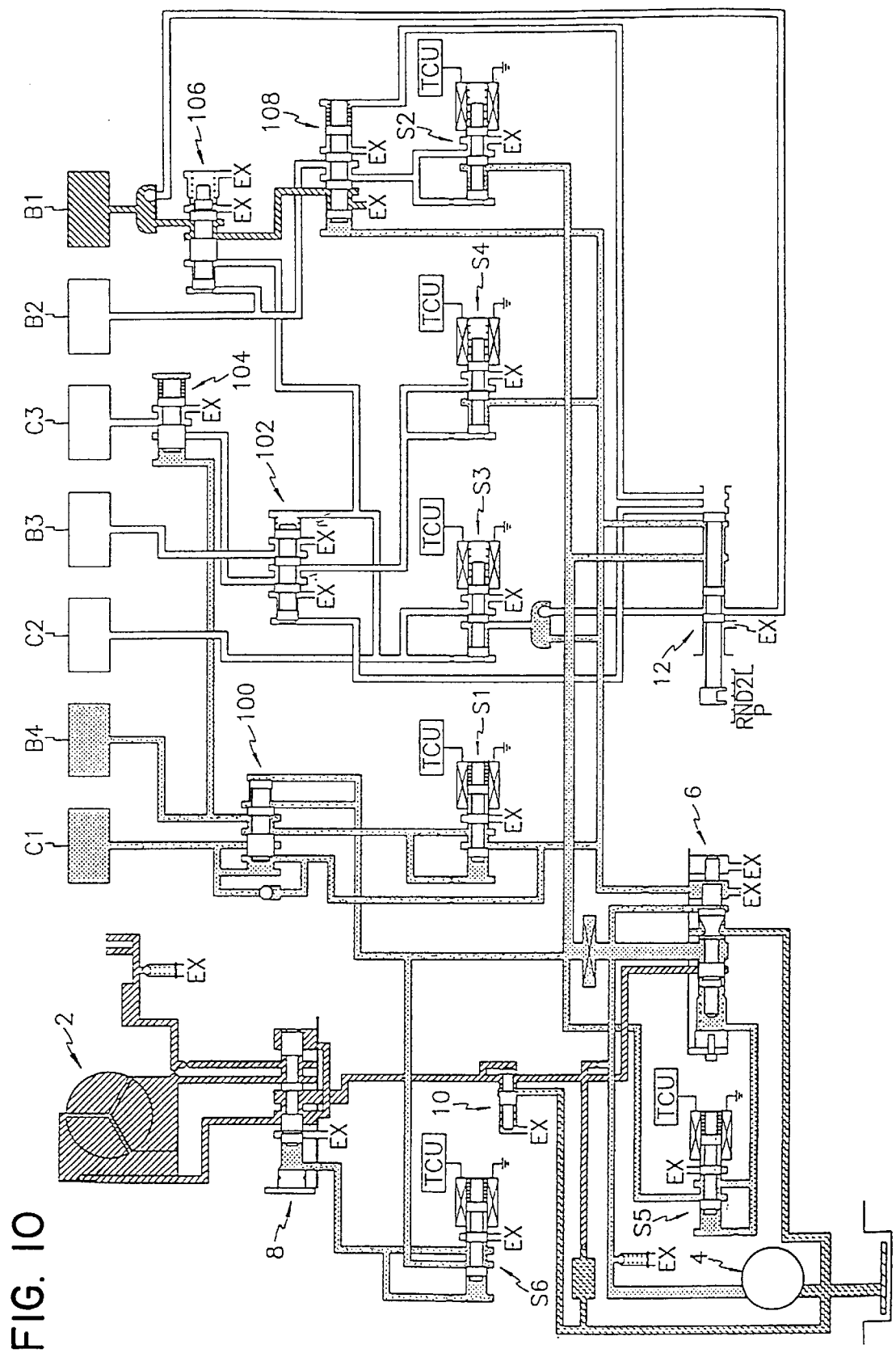
FIG. 10 illustrates the hydraulic pressure flow state in a first speed stage of the drive range of the hydraulic control system according to the present invention.

Next, driving in the D4 range of FIG. 2 will be described. When driving in this range, overdrive is enabled and the operator, as shown in FIG. 10, has placed the manual valve 12 in the D range.

When first placed in drive, the TCU turns the second, third and fourth solenoid valves S2–S4 ON, and turns the first solenoid valve S1 OFF. When the manual valve 12 is first moved to the D range, hydraulic fluid is initially supplied to first clutch C1 by the first switch valve 100. However, back pressure on the first land 166 of the first switch valve 100 builds up, and moves the first switch valve 100 to the right. This maintains the hydraulic pressure in clutch C1, and allows the supply of hydraulic fluid to reach the fourth brake B4 via the first solenoid valve S1 and the first switch valve 100. The manual valve 12 also supplies hydraulic pressure to the third switch valve 108, such that the third switch valve 108 moves to the right. As a result, the hydraulic pressure in the first brake B1 exhausts via the second fail-safe valve 106 and the third switch valve 108. In their ON state, second, third and fourth solenoid valves S2–S3 prevent the hydraulic pressure from flowing therethrough.

If the vehicle speed increases, then the TCU will decide to shift the automatic transmission from the first speed stage to the second speed stage. In the second speed stage, the TCU turns the second solenoid valve OFF, such that the first and second solenoid valves are off, while the third and fourth solenoid valves and S3 and S4 are on.

Figure 11:
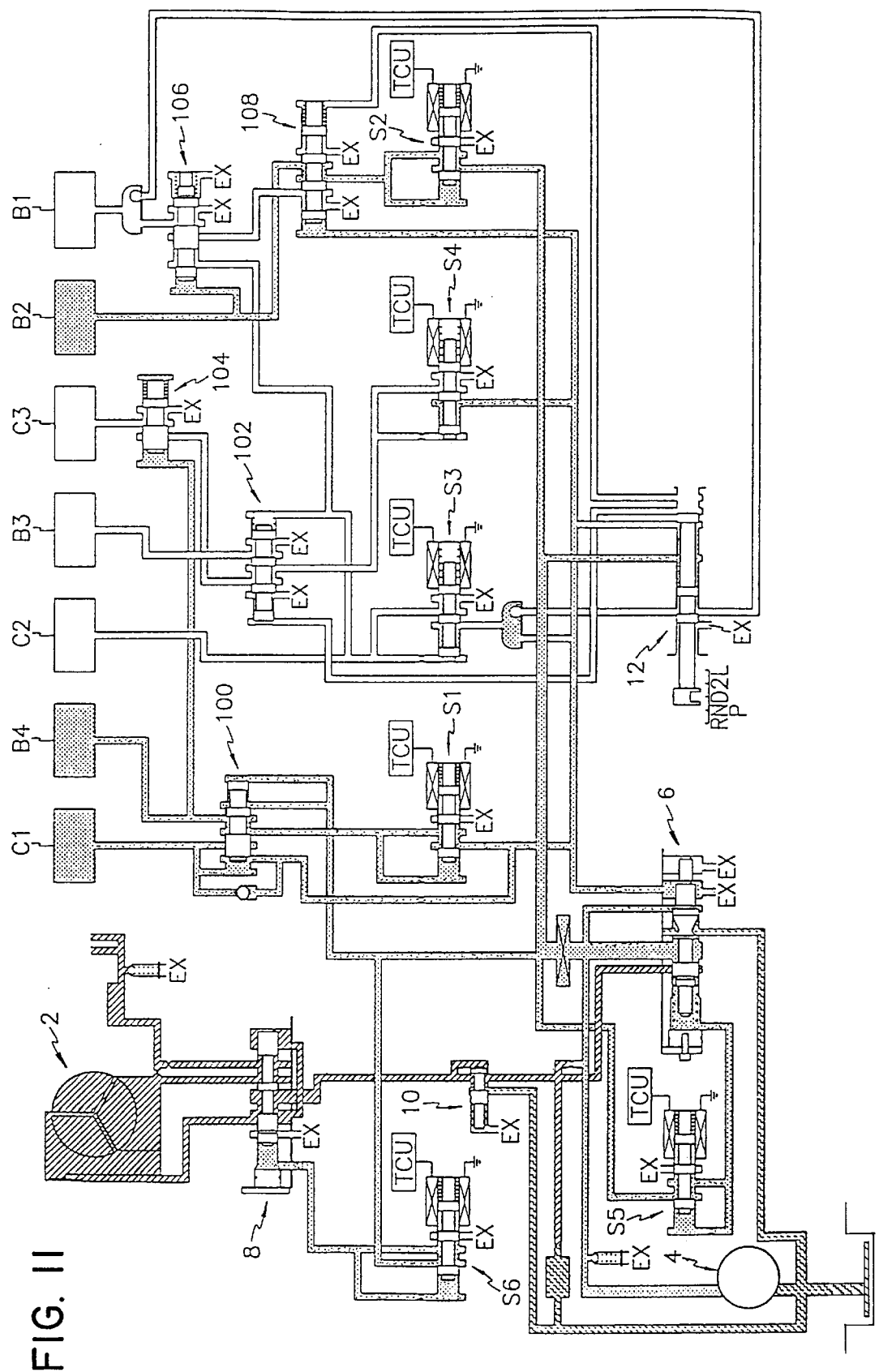
FIG. 11 illustrates the hydraulic pressure flow state in the second speed stage of a drive range of the hydraulic control system according to the present invention.

FIG. 11 illustrates the hydraulic pressure flow state in the second speed stage of the D4 driving range. Because the second solenoid valve S2 is OFF, hydraulic pressure flows therethrough, and is supplied to the second brake B2 via the third switch valve 108. The hydraulic pressure supplied to the second brake B2 is also supplied to and biases the second fail-safe valve 106 such that the first brake B1 cannot be engaged. For instance, as shown in FIG. 11, any hydraulic fluid supplied to the brake B1 would be exhausted via the second fail-safe valve 106.

Through this operation, the first and second brakes B1 and B2 cannot be engaged simultaneously. Since the simultaneous engagement of the first and second brakes B1 and B2 will cause the automatic transmission to fail, the above operation prevents failure of the automatic transmission.

Figure 12:
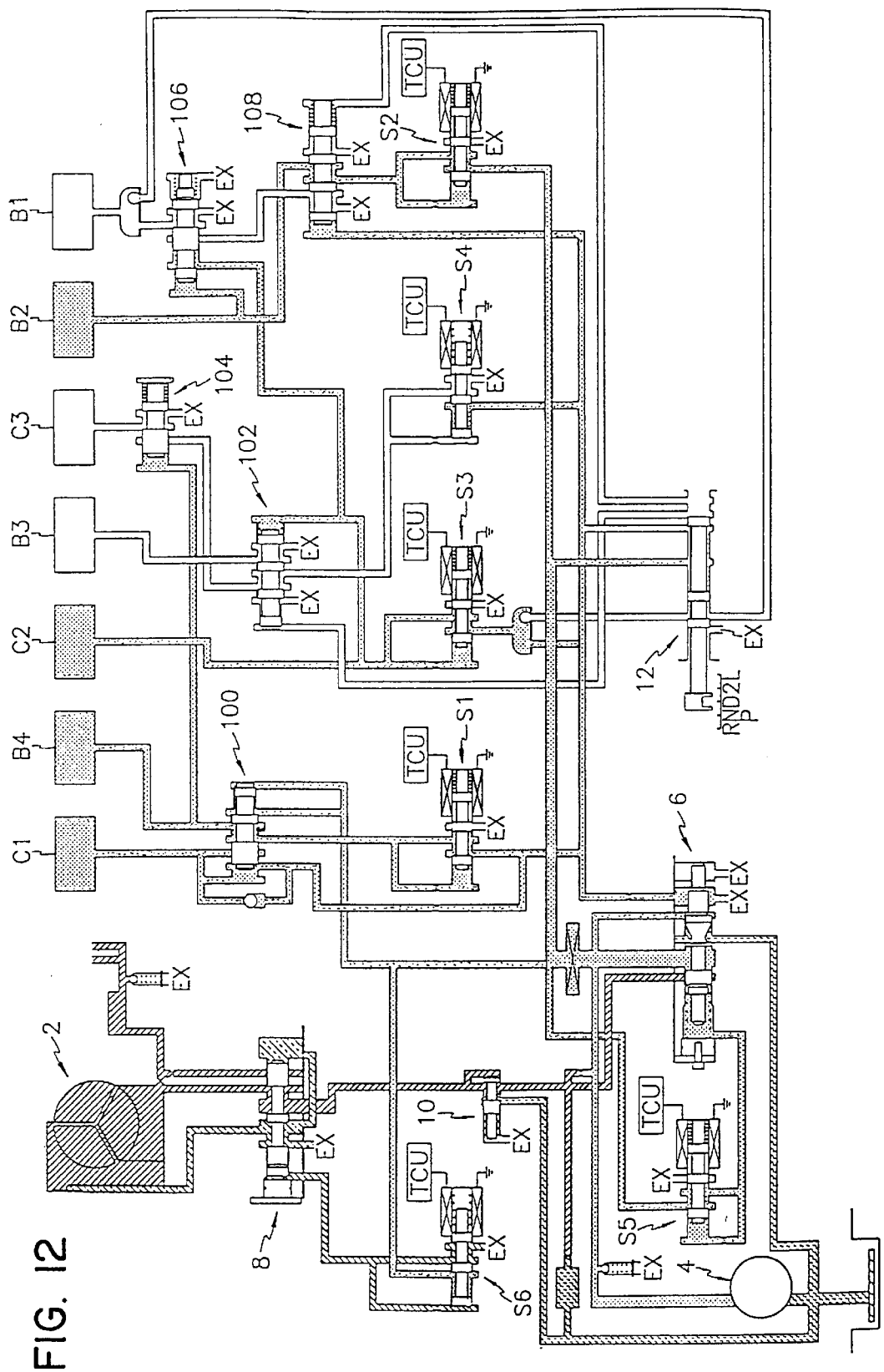
FIG. 12 illustrates the hydraulic pressure flow state in the third speed stage of a drive range of the hydraulic control system according to the present invention.

If the speed continues to increase, then the TCU will cause the automatic transmission to shift from the second speed stage to the third speed stage. Specifically, the TCU will turn the third solenoid valve S3 OFF, such that the first-third solenoid valves S1–S3 are OFF, and the fourth solenoid valve S4 is on. FIG. 12 illustrates the hydraulic pressure flow state in the third speed stage of the D4 driving range for the hydraulic control system according to the present invention.

Because the third solenoid valve S3 is turned OFF, hydraulic pressure from the manual valve 12 is supplied via the third solenoid valve S3 to the second clutch C2, and the second switch valve 102. Hydraulic pressure supplied to the second switch valve 102 biases the second switch valve 102 such that any hydraulic pressure supplied to brake B3 will be exhausted via the second switch valve 102. This prevents the detrimental simultaneous engagement of both the second clutch C2 and the third brake B3.

If the vehicle speed continues to increase, then the TCU will decide to switch the automatic transmission from the third speed stage to the fourth speed stage. In this event, the TCU will turn the fourth solenoid valve S4 OFF and the first solenoid valve S1 ON such that the first solenoid valve S1 is ON and the second-fourth solenoid valves S2–S4 are OFF.

Figure 13:
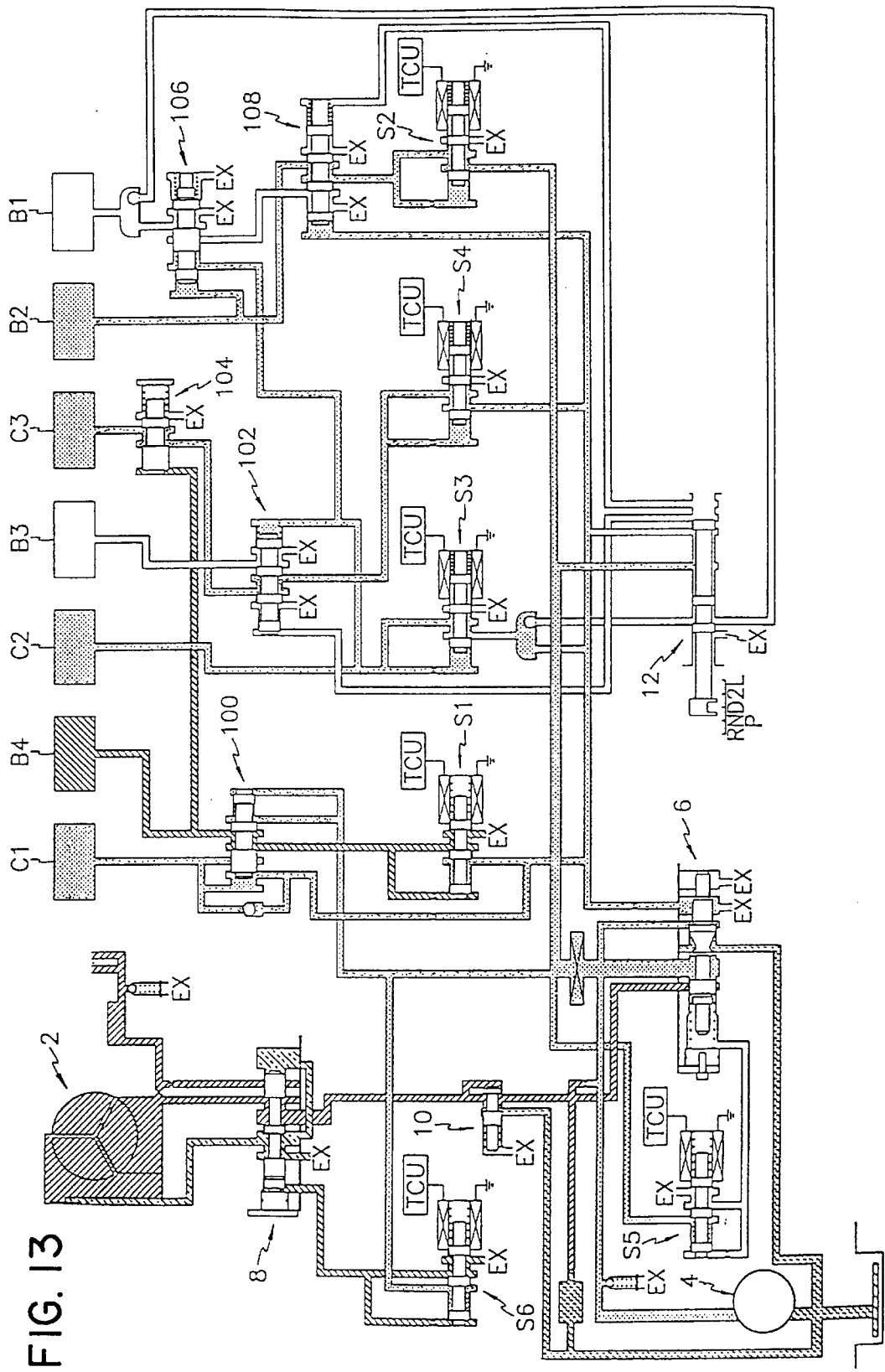
FIG. 13 illustrates the hydraulic pressure flow state of the fourth speed stage of a drive range of the hydraulic control system according to the present invention.

FIG. 13 illustrates the hydraulic pressure flow state in the fourth speed stage of the D4 driving range for the hydraulic control system of the present invention. As shown, because the first solenoid valve S1 is ON, hydraulic pressure in the fourth brake B4 is exhausted by the solenoid valve S1 via the first switch valve 100. Because the fourth solenoid valve S4 is OFF, hydraulic pressure from the manual valve 12 is supplied to the third clutch C3 via the second switch valve 102 and the first fail-safe valve 104. The third clutch C3, however, cannot engage until the hydraulic pressure from the fourth brake B4 is exhausted. This is because the hydraulic pressure supplied to the fourth brake B4 biases the first fail-safe valve 104 such that the first fail-safe valve 104 prevents hydraulic pressure from reaching the third clutch C3. When the fourth brake B4 is exhausted of hydraulic pressure, the first fail-safe valve 104 is no longer biased, and hydraulic pressure can then reach the third clutch C3. In this manner, the third clutch C3 and the fourth brake B4 are not simultaneously engaged. As discussed above, simultaneous engagement of the third clutch C3 and the fourth brake B4 would cause the automatic transmission to fail.

Operation in the D3 driving range, where overdrive is not permitted, is the same as discussed above, except that the fourth speed stage is never reached.

As discussed previously, a driver can also select the D2 driving range via the manual valve 12. As illustrated in FIG. 2, only a first speed stage and a second speed stage can be achieved in the D2 driving range. As shown in FIG. 2, in the first speed stage of the D2 drive range, the TCU turns the first solenoid valve S1 OFF and turns the second, third and fourth solenoid valves S2, S3 and S4 ON. The first-fourth solenoid valves S1–S2 have the same state as in the D4 driving range. The manual valve 12 supplies hydraulic pressure to the second switch valve 102, unlike in the first speed stage of the D4 driving range, such that the second switch valve 102 is biased to the right. This biasing, however, does not affect the friction elements engaged in the first speed stage of the D2 driving range. Consequently, the first speed stage in the D2 driving range is the same as the first speed stage in the D4 driving range.

If the vehicle speed increases, the TCU will decide to shift from the first speed stage to the second speed stage in the D2 driving range. As shown in FIG. 2 in the second speed stage, the TCU turns the second and fourth solenoid valves S2 and S4 OFF such that the first, second and fourth solenoid valves S1, S2 and S4 are OFF and the third solenoid valve S3 is ON. The state of the solenoid values in the second speed stage of the D2 driving range differs from the state of the solenoid valves in the second speed stage of the D4 driving range.

Figure 14:
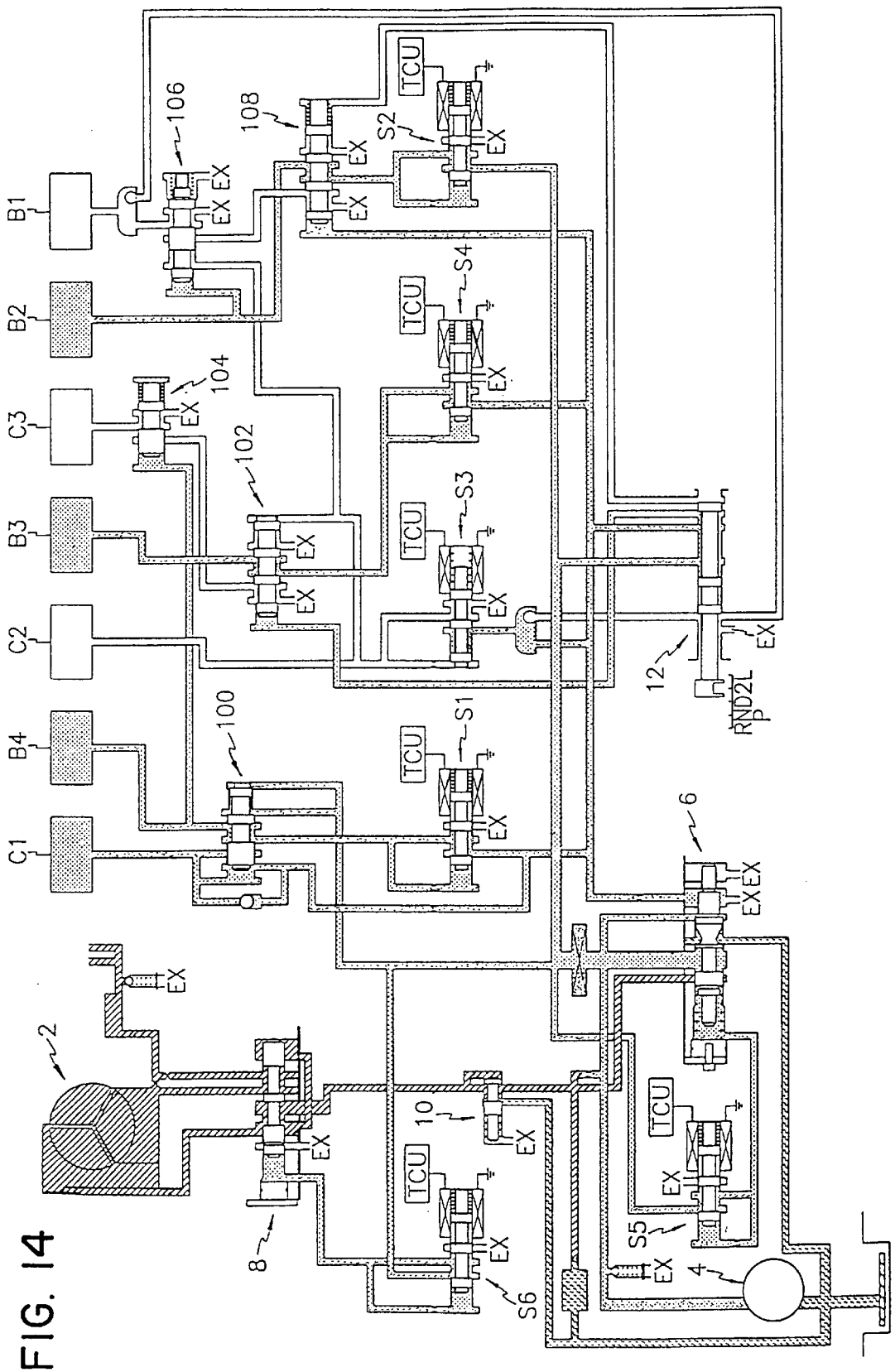
FIG. 14 illustrates the hydraulic pressure flow state in the second speed stage of another drive range of the hydraulic control system according to the present invention.

FIG. 14 illustrates the hydraulic pressure flow state in the second speed stage of the D2 driving range for the hydraulic control system according to the present invention. As with the second speed stage of the D4 driving range discussed with respect to FIG. 11, first clutch C1, second brake B2 and fourth brake B4 are engaged. However, because the fourth solenoid valve S4 is also turned OFF in the second speed stage of the D2 driving range, hydraulic pressure is supplied to the third brake B3 via the second switch valve 102 and the fourth solenoid S4. As a result of the application of the third brake B3, engine braking is achieved.

The drive can also select the lowest drive range or DL driving range using manual valve 12. As shown in FIG. 2, the DL driving range has only a first speed stage. In this first speed stage, the TCU turns the first and second solenoid valves S1 and S2 OFF and turns the third and fourth solenoid valves S3 and S4 ON. Unlike the first speed stage in the D4, D3 and D2 driving ranges, the second solenoid valve S2 is turned OFF.

Figure 15:
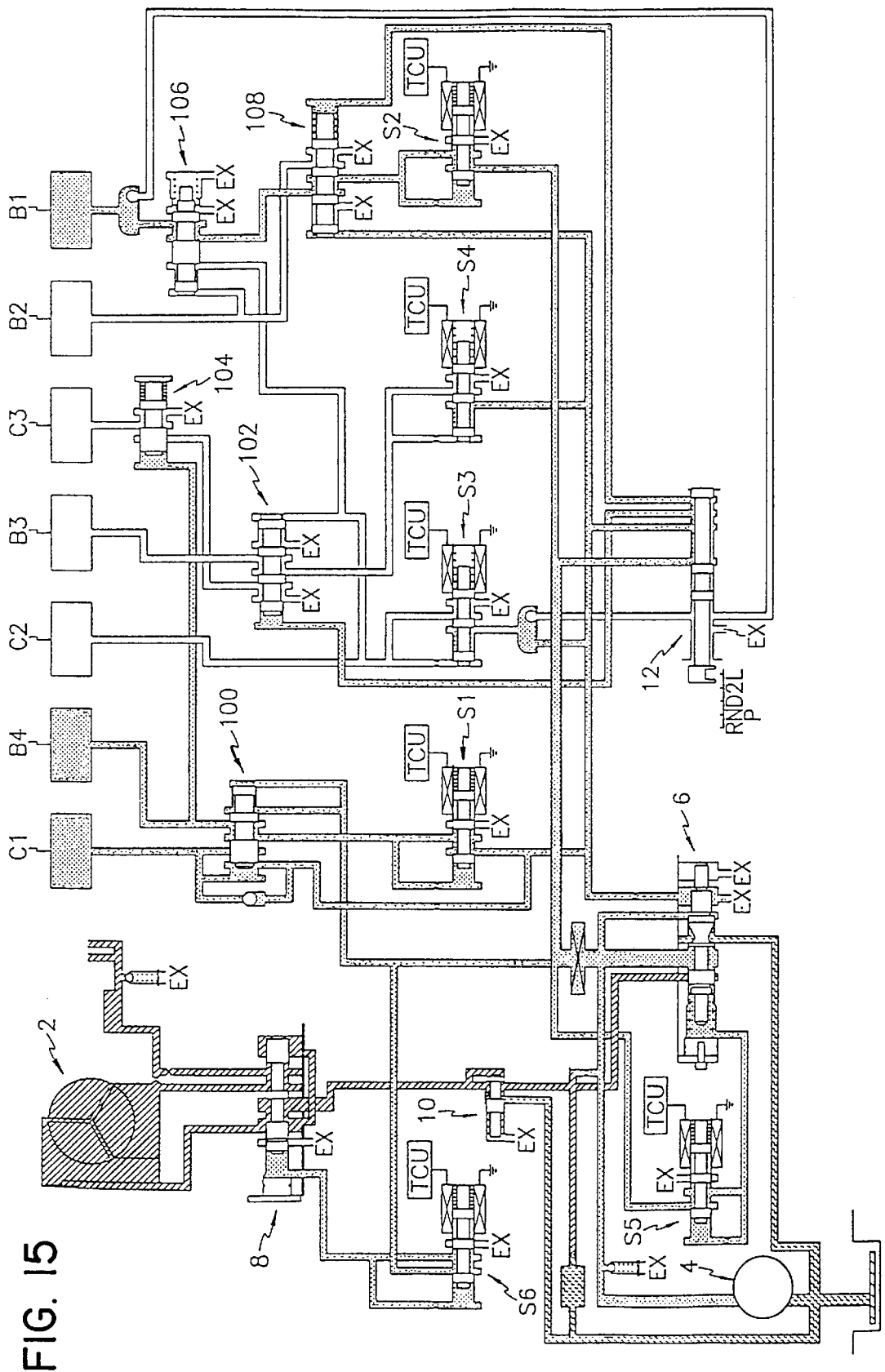
FIG. 15 illustrates the hydraulic pressure flow state in the first speed stage of the lowest drive range of the hydraulic control system according to the present invention.

As shown in FIG. 15, the hydraulic pressure flow state for the DL driving range is different from the second speed stage of the D4 driving range. The manual valve 12 in the DL driving range supplies hydraulic fluid to the third switch valve 108, unlike the D4 driving range, such that hydraulic fluid passing through the second solenoid S2 is supplied to the first brake B1 via the second fail-safe valve 106. As with the second speed stage of the D2 driving range, the DL drive range provides engine braking.

As the discussion above indicates, the hydraulic control system according to the present invention does not require a solenoid valve to control each friction element. While the automatic transmission controlled by the hydraulic control system according to the present invention includes seven friction elements, the hydraulic control system according to the present invention only includes four solenoid valves for controlling those friction elements. Unlike conventional hydraulic control systems, a single solenoid controls more than one friction element. But, the simultaneous engagement of friction elements, which would cause the automatic transmission to fail, is still prevented. Because the number of solenoid valves has been reduced in the hydraulic control system according to the present invention, the cost of the hydraulic control system is also reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control system for an automatic transmission comprising:

pressure regulating means for regulating hydraulic pressure produced in an oil pump;

a plurality of valves selectively supplying said regulated hydraulic pressure to a first number of friction elements including first, second, third, fourth, fifth, sixth and seventh friction elements, said plurality of valves including first, second, and third switch valves and first and second fail-safe valves;

a second number of solenoid valves including first, second, third, and fourth solenoid valves controlling operation of said first number of friction elements by controlling supply of said regulated hydraulic pressure to said plurality of valves, said first number of friction elements being greater in number than said second number of solenoid valves, each said solenoid valve including a solenoid directly controlling a valve spool in accordance with an electronic control unit such that a respective valve spool and solenoid are provided as a single unit;

a fifth solenoid valve for controlling a damper clutch control valve, wherein said solenoid valves control said plurality of valves such that said second switch valve supplies hydraulic pressure to said third friction element and exhausts hydraulic pressure from said fourth friction element in shifting from a second speed stage to a third speed stage; and a manual valve controlling supply of said regulated pressure to said second number of solenoid valves.

2. The hydraulic control system of claim 1, wherein said first, second, third, and fourth solenoid valves control operation of two of said first number of said friction elements.

3. The hydraulic control system of claim 1, wherein said solenoid valves control said first friction element such that said first friction element is engaged during first, second, third and fourth forward speed stages.

4. The hydraulic control system of claim 1, wherein said solenoid valves control said second friction element such that said second friction element is engaged during first, second and third forward speed stages, and disengaged during a fourth forward speed stage.

* * * * *